United States Patent
Cohen et al.

(10) Patent No.: US 10,613,106 B2
(45) Date of Patent: Apr. 7, 2020

(54) REACTION VESSEL HANDLING APPARATUS, TESTING APPARATUS, AND METHODS USING SAME

(71) Applicant: Siemens Healthcare Diagnostics Inc., Tarrytown, NY (US)

(72) Inventors: Beri Cohen, Hartsdale, NY (US); Nicolae Dumitrescu, Stamford, CT (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 356 days.

(21) Appl. No.: 15/304,665

(22) PCT Filed: Apr. 15, 2015

(86) PCT No.: PCT/US2015/026018
§ 371 (c)(1),
(2) Date: Oct. 17, 2016

(87) PCT Pub. No.: WO2015/160984
PCT Pub. Date: Oct. 22, 2015

(65) Prior Publication Data
US 2017/0045541 A1    Feb. 16, 2017

Related U.S. Application Data

(60) Provisional application No. 61/981,468, filed on Apr. 18, 2014.

(51) Int. Cl.
*G01N 1/00* (2006.01)
*G01N 35/02* (2006.01)
(Continued)

(52) U.S. Cl.
CPC ........... *G01N 35/025* (2013.01); *G01N 35/04* (2013.01); *G01N 2035/00356* (2013.01);
(Continued)

(58) Field of Classification Search
CPC ........................................ G01N 1/00
See application file for complete search history.

(56) References Cited

U.S. PATENT DOCUMENTS

| 4,855,110 A | 8/1989 | Marker et al. |
| 5,434,083 A | 7/1995 | Mitsumaki et al. |

(Continued)

FOREIGN PATENT DOCUMENTS

EP    0 403 905 A1    12/1990

OTHER PUBLICATIONS

Extended EP Search Report dated Mar. 14, 2017 of corresponding European Application No. 15780640.7, 4 Pages.
(Continued)

*Primary Examiner* — Jyoti Nagpaul

(57) ABSTRACT

Disclosed is a reaction vessel handling apparatus adapted for use in a biological fluid testing apparatus. The reaction vessel handling apparatus includes an incubation member and wash member that are overlapping. A transfer device transfers reaction vessels between the incubation member and wash member at the overlapping portions. Incubation and wash members may be rings. Testing apparatus (e.g., immunoassay apparatus or clinical analyzer apparatus) including the reaction vessel handling apparatus and methods of operating the apparatus are provided, as are other aspects.

22 Claims, 10 Drawing Sheets

(51) Int. Cl.
*G01N 35/04* (2006.01)
*G01N 35/00* (2006.01)

(52) U.S. Cl.
CPC ............... *G01N 2035/0401* (2013.01); *G01N 2035/041* (2013.01); *G01N 2035/0444* (2013.01); *G01N 2035/0446* (2013.01); *G01N 2035/0453* (2013.01); *G01N 2035/0455* (2013.01); *G01N 2035/0467* (2013.01)

(56) References Cited

U.S. PATENT DOCUMENTS

| | | |
|---|---|---|
| 5,441,891 A | 8/1995 | Burkovich et al. |
| 5,846,491 A | 12/1998 | Choperena et al. |
| 5,885,530 A * | 3/1999 | Babson .............. B01L 3/50853 422/63 |
| 5,985,672 A | 11/1999 | Kegelman et al. |
| 6,551,833 B1 * | 4/2003 | Lehtinen ............... G01N 35/04 198/349.5 |
| 2005/0123445 A1 | 7/2005 | Blecka et al. |
| 2007/0020145 A1 | 1/2007 | Oonuma |
| 2009/0098023 A1 | 4/2009 | Smith et al. |
| 2010/0112567 A1 | 5/2010 | Adolfsen et al. |

OTHER PUBLICATIONS

PCT International Search Report and Written Opinion dated Jul. 8, 2015 (9 Pages).

\* cited by examiner

REACTION VESSEL HANDLING APPARATUS, TESTING APPARATUS, AND METHODS USING SAME

RELATED APPLICATION

This application claims priority to U.S. Provisional Application Ser. No. 61/981,466 entitled "REACTION VESSEL HANDLING APPARATUS, TESTING APPARATUS, AND METHODS USING SAME" filed on Apr. 18, 2014, the disclosure of which is hereby incorporated by reference in its entirety herein.

FIELD

The present invention relates generally to testing apparatus and methods, and more specifically to reaction vessel handling apparatus.

BACKGROUND

In medical testing and processing (e.g., immunoassay testing and/or clinical analysis), robotics have been used to minimize exposure to, or contact with, bodily fluid samples (otherwise referred to as "specimens") and/or to increase productivity. For example, in some existing automated testing and processing systems, reagent dispensing packs may be provided in accessible locations, that may have multiple compartments containing different reagents. Likewise, sample containers (such as blood collection tubes or the like) may be provided at another location, such as in a sample rack. Conventionally, both the blood collection tubes and reagent dispensing packs have been accessed by pipettes. One pipette aspirates a predetermined amount of the specimen and dispenses it into a reaction vessel (e.g., cuvette), while one or more other pipettes aspirate one or more reagents and also dispenses them into the reaction vessel. The reaction vessel may be placed in an incubation ring and then incubated for a defined period of time. Once the reaction is sufficiently completed, the reacted sample, which may be bound to a solid phase particle (e.g., a magnetic particle) may go through a wash process on the incubation ring to separate the components of interest bound to a solid phase from various unbound components. The contents of the reaction vessel may then separated from the solid phase and read by a suitable test apparatus on the incubation ring, such as a luminometer. This testing may determine a characteristic, typically a concentration of a component in the reacted sample.

Although existing testing apparatus and methods may provide suitable efficiencies, more efficient testing apparatus and methods are sought to further reduce processing time and cost, as well as overall testing system cost. Additionally, more capable testing systems (immunoassay instruments or clinical analyzers) are desired that may undergo different incubation times, multiple reagent additions, multiple incubations and/or multiple wash steps. Accordingly, apparatus and methods that may improve speed and/or capability in biological specimen testing are desired.

SUMMARY

In a first embodiment, a reaction vessel handling apparatus is provided. The reaction vessel handling apparatus includes an incubation member adapted to contain a plurality of reaction vessels, a wash member overlapping the incubation member at a different elevation, and a transfer device operable to move one or more reaction vessels between the incubation member and the wash member.

In another embodiment, a testing apparatus is provided. The testing apparatus includes a reaction vessel handling apparatus having an incubation member adapted to contain a plurality of reaction vessels, a wash member overlapping the incubation member and located at a different elevation, and a transfer device operable to move one or more reaction vessels between the incubation member and the wash member, a dispensing system adapted to provide biofluid samples and one or more reagents into the plurality of reaction vessels, and a testing apparatus adapted to receive reaction vessels from the wash member.

In another embodiment, a method of handling reaction vessels is provided. The method of handling reaction vessels includes providing an incubation member adapted to contain a plurality of reaction vessels, and a wash member overlapping the incubation member at a different elevation, and transferring one or more of the plurality of reaction vessel between the incubation member and the wash member with a transfer device.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention is to cover all modifications, equivalents, and alternatives falling within the scope of the invention.

DETAILED DESCRIPTION

Figure 1:
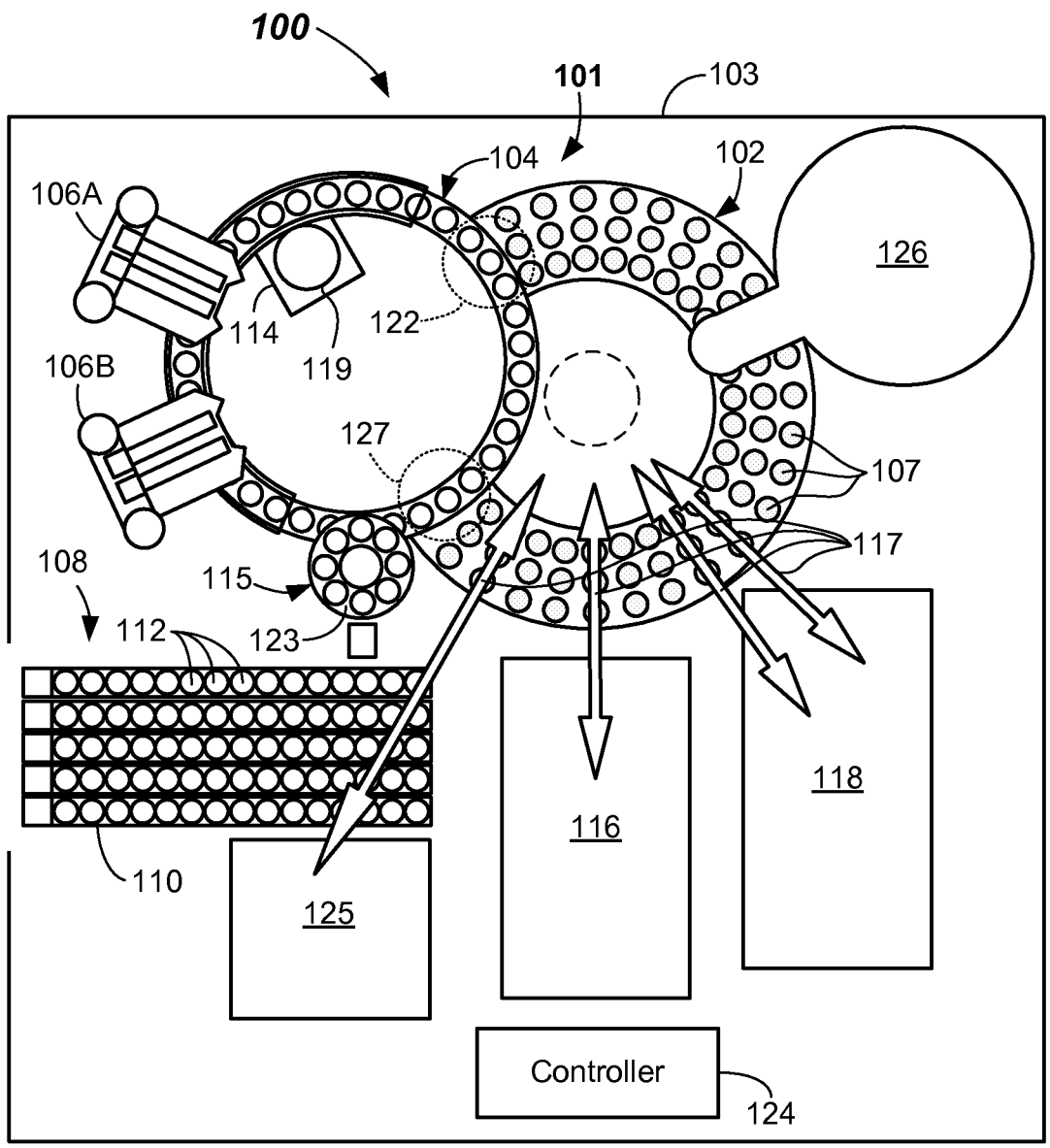
FIG. 1 illustrates a schematic top view of a reaction vessel handling apparatus provided within a testing instrument such as an immunoassay apparatus according to embodiments.

Embodiments of the present invention provide improved testing instruments (e.g., immunoassay systems and clinical analyzers), reaction vessel handling apparatus, and methods adapted and operational to facilitate movement of reaction vessels. The movement is adapted to carry out sample and reagent fill operations, incubation, reacted sample wash operations, and testing operations. Accordingly, the reaction vessel handling apparatus described herein, which may be embodied in a testing instrument, allows seamless operation of the above functions while allowing selected and varying incubation lengths and multiple wash operations. In some embodiments, multiple reagent additions may be accomplished. Further, the wash and incubation functions may be separated, thus providing more system flexibility and reducing operational bottlenecks.

In particular, in some embodiments, a reaction vessel handling apparatus of a testing instrument (e.g., immunoassay apparatus) includes: an incubation member, such as an incubation ring, adapted to contain one or more reaction vessels, and a wash member, such as a wash ring. The incubation member (e.g., incubation ring) may hold combinations of empty reaction vessels, sample filled reaction vessels, and sample and reagent filled reaction vessels. Incubation member may be used to carry sample and reagent filled reaction vessels as the combination is incubating. The wash member (e.g., wash ring) is adapted to carry reaction vessels that are adapted to undergo a washing operation at one or more wash stations. In some embodiments, multiple wash stations may be present on the wash member. The incubation and wash members (e.g., rings) may be overlapped to some extent, such that reaction vessels may pass between them at the overlap. In particular, a transfer device (e.g., a lift device) may be operable to move the reaction vessels between the incubation and wash members (e.g., rings) at selected times. Transfer between the respective incubation and wash member may be by any suitable transfer device. Reaction vessels may be transferred from the incubation member to the wash member, and even back again. One or more than one transfer devices may be used. Furthermore, in some embodiments, a first transfer may take place at one overlap location and second transfer may take place at another overlap location.

In one or more embodiments, the transfer device may include one or more engaging members, which contact one or more of the reaction vessels and transfer the one or more vessels (e.g., along a generally vertical path) between the incubation member and the wash member (e.g., between incubation ring and wash ring). Once transferred to the wash member, the one or more reaction vessels may undergo a wash operation at a wash station. The reaction vessels may then undergo testing at a testing station. Testing station may include a test ring that is overlapping with the wash member (e.g., wash ring) in some embodiments.

These and other aspects and features of embodiments of the invention will be described with reference to FIGS. 1-7 herein.

In accordance with a first embodiment of the invention, as best shown in FIG. 1, an immunoassay apparatus 100 including a reaction vessel transfer apparatus 101 is shown. The immunoassay apparatus 100 is useful for carrying out immunoassay testing to determine the presence of a particular analyte or other material or substance present within a specimen (e.g., a biofluid sample).

In particular, the described embodiment of immunoassay apparatus 100 includes a housing 103 that may fully or partially surround the various internal components thereof. The reaction vessel transfer apparatus 101 may be located within the housing 103 and may be made up of an incubation member 102, such as an incubation ring and a wash member 104 such as a wash ring. Each of the incubation member 102 and the wash member 104 may be configured to contain one or more reaction vessels 107. Incubation member 102 and a wash member 104 may be rings and may be rotatable about a central axis of each. The incubation member 102 and the wash member 104 may be independently rotatable in some embodiments. Incubation member 102 may have a circular shape and may have a plurality of receptacles therein that are adapted to receive and position reaction vessels 107 thereon. The incubation member 102 may include one or more rings of receptacles, which may be concentric. In some embodiments, individual rings (e.g., concentric annular rings) of the incubation member 102 may be independently rotatable relative to one another. Thus, the individual rings may be rotated at different rates and in different directions, for example. Although rings are described herein, other configurations, such as race tracks, and moveable platforms may be used for the incubation member 102.

The immunoassay apparatus 100 may include a sample input area 108 that may include one or more sample racks 110 containing sample containers 112 (a few labeled). Any suitably-sized sample rack 110 may be used. The sample racks 110 may be inserted into and/or removed from the immunoassay apparatus 100 through a door or opening formed in the housing 103. Locating features (not shown) within the immunoassay apparatus 100 may function to precisely position the sample rack 110 within the interior of the immunoassay apparatus 100. Alternatively, sample containers 112 may be presented to the immunoassay apparatus via a laboratory automation track (not shown).

The immunoassay apparatus 100 may include one or more reagent supplies 116, 118 adapted to provide one or more reagent types into the reaction vessels 107 residing in receptacles formed in the incubation member 102. In some embodiments, the reagent supplies 116, 118 may be configured as one or more rings or carousels. In particular, the reagent supplies 116, 118 may be arranged with their long dimension oriented radially along a rotating carousel and may extend along the radius of the carousel from a rotational axis thereof. Suitable pockets or other retaining features may be provided on the carousel to position and secure reagent dispensers in a defined orientation thereon.

The incubation member 102 and a wash member 104, and reagent carousel(s) (if used for reagent supplies 116, 118) may be rotatable about their respective rotational axes by any number of suitable motors and drive systems. Motors may be stepper motors or the like. Other suitable motors and/or drive systems may be used to accomplish rotation, positioning and alignment of the incubation member 102 and a wash member 104, and reagent carousel(s), if used as reagent supplies 116, 118.

As shown in FIG. 1, a plurality of probes may move along arrows 117 and may operate to aspirate and dispense sample from the sample containers 112 the sample input area 108, and dispense one or more reagents from the reagent supplies 116, 118. The probes may be moved by a suitable conventional robot apparatus (not shown) attached to each probe. Arrows 117 depict example motions of the probes to aspirate and dispense into reaction vessels 107 residing in the incubation member 102. The robot apparatus may be conventional multi-arm robots, gantry robots, or the like. Other types of robot apparatus may be used. The robot apparatus may include suitable elements to accomplish two-dimensional motion, or even three-dimensional motion thereof. For example, robot apparatus may be capable of producing motion along the directions of arrows 117 shown, and also capable of vertical (Z direction) motion (e.g., Y-Z robot apparatus). The means for moving the probes may include any suitable conventional motion-producing mechanism, such as one or more stepper motors, servo motors, DC or AC motors, pneumatic or hydraulic motors, or the like. Furthermore, drive systems including chains, guides, pulley and belt arrangements, gear or worm drives, rack and pinions, or other conventional drive components may be utilized to cause the motion of the components of the robot apparatus.

Reaction vessels 107 residing in the incubation member 102 may be supplied by a reaction vessel loader 126, such as a conventional cuvette loader. A probe tip supply 125 may be provided at a location accessible by at least the sample probe. A reaction vessel unloading mechanism (not show) may also be used. For example, reaction vessels may be discharged through the testing apparatus 115, such as a luminometer, after completing the desired test. In other embodiments, the cuvettes may be washed and reused.

In one or more embodiments, the incubation member 102 and the wash member 104 may be overlapping with one another. In the depicted embodiment, the incubation member 102 (e.g., incubation ring) is configured to rotate underneath a portion of the wash member 104 (e.g., wash ring). However, other overlapping orientations may be used. Incubation member 102 may hold the reaction vessels 107 (e.g., clear cuvettes) and provide them in a circle-shaped orientation. Reaction vessels 107 may be arranged at a single common radius, or at more than one radius (as shown). Incubation member 102 may include any suitable construction enabling the carrying of reaction vessels 107, and may include a plurality of receptacles adapted to receive reaction vessels 107 therein. Incubation member 102 and wash member 104 may be molded plastic articles, for example.

Like incubation member 102, wash member 104 may be rotated by a suitable member, such as a wash ring motor 114 and drive system. Drive system may include a drive gear 119 driven by wash ring motor 114. Drive gear 119 may mesh with gear teeth formed on the wash member 104 (e.g., wash ring) in some embodiments. As shown, driving the wash ring motor 114 moved (e.g., rotates) the wash member 104.

Wash member 104 may include one or more wash stations 106A, 106B positioned thereon. Wash stations 106A, 106B are of conventional construction. If magnetic particles are used in the immunoassay process, the one or more wash stations 106A, 106B may be adapted with one or more fixed magnets or electromagnets to move such particles to the sides of reaction vessels 107, as desired during washing.

The one or more wash stations 106A, 106B may be operable to appropriately wash the unbound sample and reagent and leave bound constituent of interest.

Figure 4:
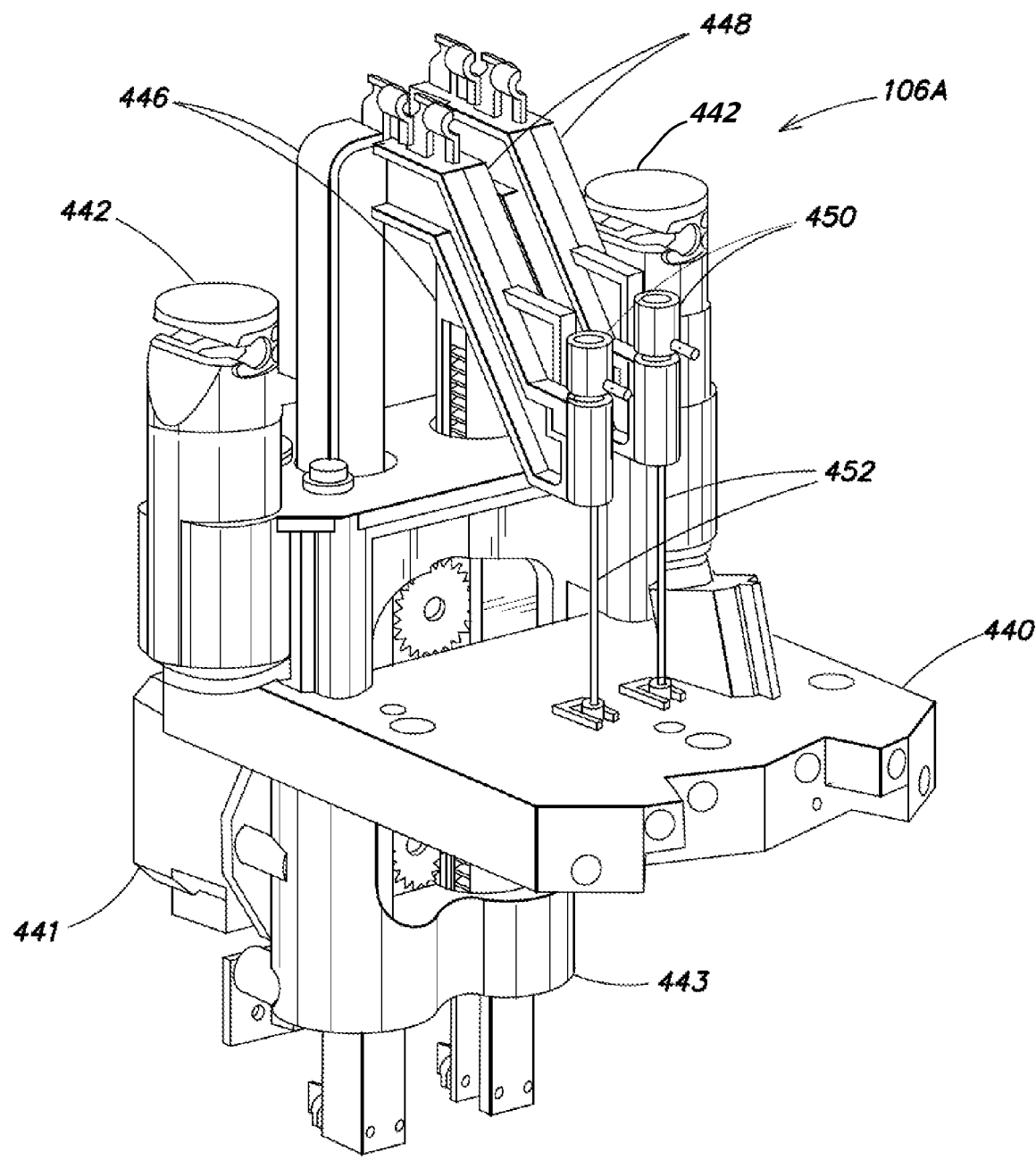
FIG. 4 illustrates an isometric view of a wash station provided as part of the wash member according to embodiments.

FIG. 4 illustrates an example embodiment of a wash station 106A that may be situated along the wash member 104. Wash station 106B may be identical to wash station 106A described herein. Wash station 106A includes a block 440 that may include various passages therein for dispensing water and/or wash solution into the reaction vessels 107 that traverse underneath the block 440 via the action (e.g., rotation) of the wash member 104 (e.g., wash ring). Nozzles 450 connect to valves 442 (e.g., pinch valves—lines not shown) and connect to a vacuum source (not shown).

Nozzles 450 aspirate sample, reagent, and wash liquid through aspirate probes 452, which may be raised and lowered via the action of uprights 446 vertically driven by one or more motors 441 and a suitable drive system (such as the rack and pinion shown) mounted to housing 443. Supports 448 are coupled to uprights 446 and move therewith raising and lowering the aspirate probes 452, as needed. The aspirate probes 452 each function to aspirate sample and reagent. After dispense of wash solution provided from block 440, aspirate probes 452 each aspirate the wash solution. Additional wash and aspiration cycles may be undertaken by wash station 106A.

After the wash operation, constituent (e.g., analyte) of interest may be readied for a test conducted by a testing apparatus 115, which may be a luminometer, or the like. Testing apparatus 115 may include a test ring 123 that receives reaction vessels 107 from the wash member 104. In this instance, a transfer device (e.g., a lift) may be used to transfer washed reaction vessels 107W (labeled in FIG. 3C) ready for test between the wash member 104 and the test ring 123. Optionally, in some embodiments, testing by the testing apparatus 115 may take place while the washed reaction vessel 107W is resident on the test member 104. Thus, in this instance, the testing apparatus 115 may be placed adjacent to the wash member 104 after the wash station 106B. In some embodiment, reaction vessels 107W may be discarded directly from the test ring 123 after testing.

A suitable transfer device 122, shown dotted in FIG. 1, may be used to transfer the reaction vessels 107 between the incubation member 102 and the wash member 104 at the overlapping portion. A controller 124 may be operable to control the motions and operation of the incubation member 102, wash member 104, transfer device 122, testing apparatus 115, various probes, reaction vessel loader 126, and the one or more wash stations 106A, 106B.

Adjacent to the staging area 108, may be probe tip supply 125 that includes probe tips that may be picked up by the probe used for aspiration of the sample.

Testing apparatus 115 of the immunoassay apparatus 100 may operate to pass light through or read light emanating from a reaction vessel 107 (e.g., a clear or translucent cuvette) and determine therefrom a characteristic of a constituent of the reaction fluid (containing specimen, one or more reagents and possibly a dilutant). For example, the testing apparatus 115 may determine luminescence, fluorescence, absorbance or the like of the reaction fluid and/or constituent contained in the reaction vessel 107. Other types of testing may be carried out on the reaction liquid and/or constituent in the reaction vessel 107. For example, other photometric, turbidimetric, chemiluminescent, fluorescent, or nephelometric tests may be carried out.

Figure 2A:
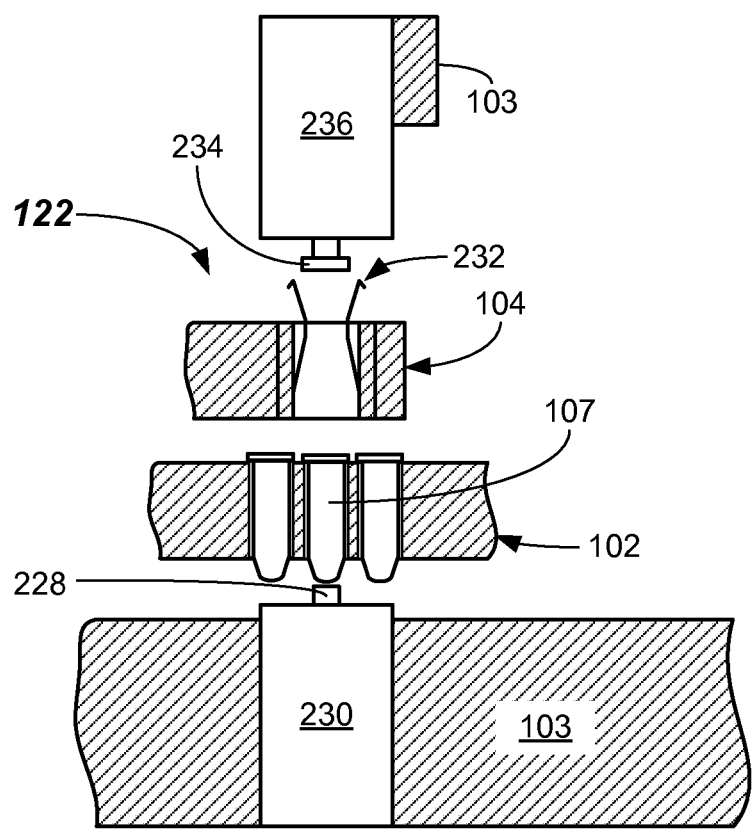
FIGS. 2A-2C illustrates partial cross-sectional side views of a transfer device operable to move reaction vessels between an incubation member and wash member of the reaction vessel handling apparatus according to embodiments.
Figure 2B:
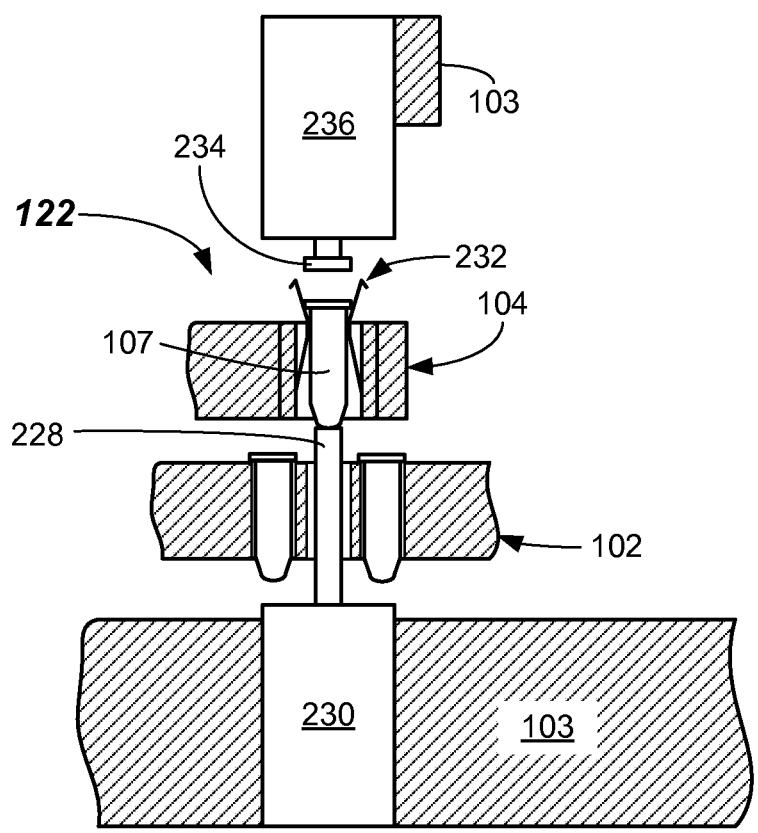
Figure 2C:
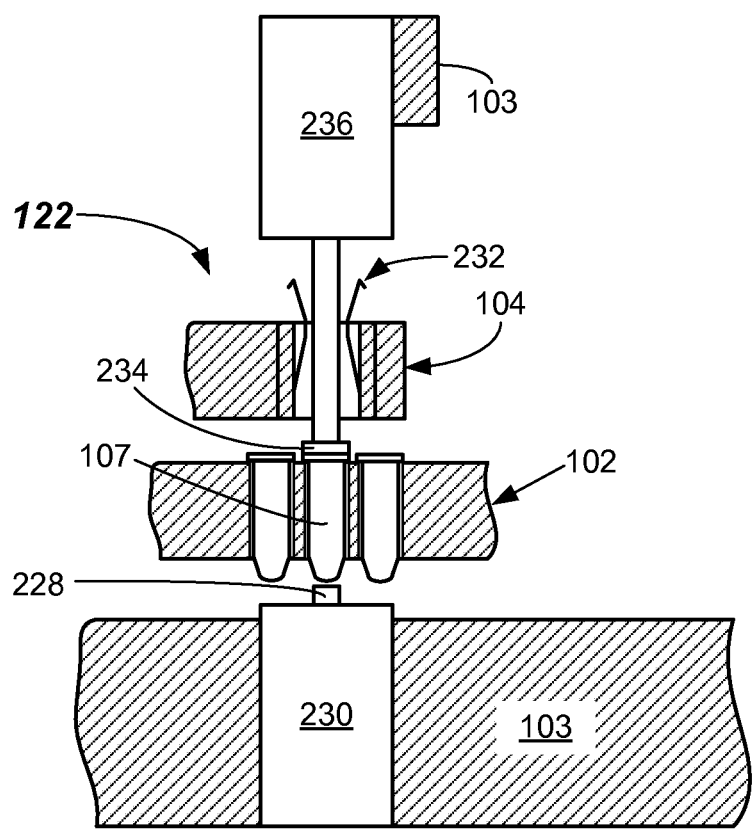

As shown in FIGS. 2A through 2C, a first example embodiment of a transfer device 122 is shown. However, any suitable device for transferring the reaction vessels 107 between the incubation member 102 and the wash member 104 may be used. In the depicted embodiment, a first push member 228 may be operable to move a reaction vessel 107 from the incubation member 102 to the wash member 104. First push member 228 may be part of, or coupled to, a first actuator 230 (e.g., a solenoid device) or other suitable motion producer. Motion of the first push member 228 moves the reaction vessel 107 vertically as shown in FIG. 2B, and deposits the reaction vessel 107 into the wash member 104. Any suitable retention feature 232 can be used to retain the reaction vessel 107 in the wash member 104. Retention feature 232 may be a spring-loaded (e.g., leaf spring) retention feature shown, or other suitable feature.

Once pushed sufficiently into the wash member 104, the reaction vessel 107 is retained in the wash member 104 and may be moved to undergo washing and then testing. Other types of retention features may be used.

In some embodiments, transfer device 122 is operable to both move the one or more reaction vessels 107 from the incubation member 102 to the wash member 104, and also return reaction vessels 107 from the wash member 104 to the incubation member 102. For example, as shown in FIG. 2C, a second push member 234 may be provided and may be driven downwardly by a second actuator 236 to push the reaction vessel 107 out of the retention feature 232 and back into the incubation member 102 to be offloaded, or for a second or further incubation pass on the incubation member 102 or for further reagent addition. In some embodiments, transferring may include simultaneously pushing the one or more of the plurality of reaction vessel 107 from a receptacle of the incubation member 102 directly into a receptacle of the wash member 104, while pushing the one or more of the plurality of reaction vessel 107 from a receptacle of the wash member 104 directly into a receptacle of the incubation member 102. In some embodiment, more than one reaction vessel may be transferred at once. This may require offset push members allowing transfer at the overlapping locations.

In another embodiment, a transfer device 122 may be used for transferring the reaction vessels 107 to the wash member 104 at a first overlap area (where the incubation member 102 and the wash member 104 overlap), and a second transfer device (e.g., transfer device 127 or 327 (FIG. 3C)) at a second overlap area may be used for transferring the reaction vessels 107 to the incubation member 102 from the wash member 104. Second transfer device 127 may be located after the testing apparatus 115.

Figure 3A:
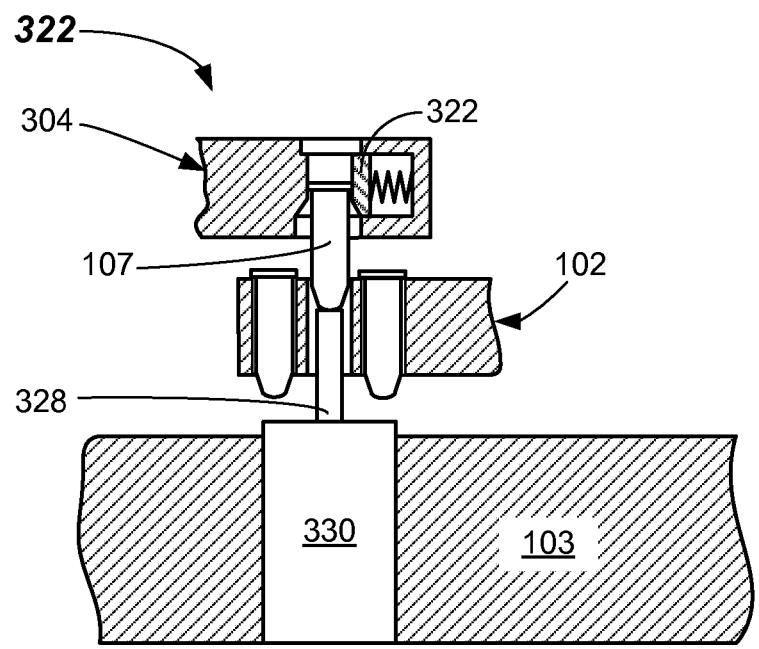
FIG. 3A illustrates partial cross-sectional side view of a transfer device operable to move reaction vessels between an incubation member and wash member according to embodiments.
Figure 3B:
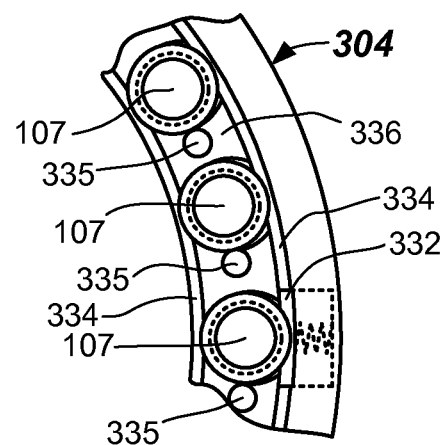
FIG. 3B illustrates partial top view of a wash member and transfer device operable to move reaction vessels between an incubation member and wash member according to embodiments.

FIGS. 3A-3B illustrates another embodiment of a transfer device 322. In this embodiment, a first push member 328 may be operable to move a reaction vessel 107 from the incubation member 102 to the wash member 304. First push member 328 may be part of, or coupled to, a first actuator 330 (e.g., a solenoid device) or other suitable motion producing device. Motion of the first push member 328 moves the reaction vessel 107 vertically and deposits the reaction vessel 107 into the wash member 304. In the depicted embodiment, a retention feature 332 may be used to retain the reaction vessel 107 in the wash member 104. Retention feature 332 may be a laterally moveable member, such as a spring-loaded retention feature shown. Lifting the reaction vessel displaces the retention feature 332 laterally. Once pushed sufficiently into the wash member 104, i.e., past the flange of the reaction vessel 107, the reaction vessel 107 is retained in the wash member 104 by the retention feature 332. Once retained, the reaction vessel 107 may be moved to undergo washing and then testing. In the depicted embodiment, a retention feature 332 is shown as a spring-loaded feature. In other embodiments, the retention feature 332 may be actuated by a solenoid or any other motion-producing device, such as a motor or drive mechanism.

In the depicted embodiment, once the reaction vessel 107 is pushed past the retention feature 332, the reaction vessel 107 is moved along the wash member 304 (e.g., wash ring) on shelves 334 upon which the flanges of the reaction vessels 107 rest. Each reaction vessel 107 is pushed along the shelves 334 on the wash member 304 by pins 335 coupled to a conveyor ring 336.

Figure 5:
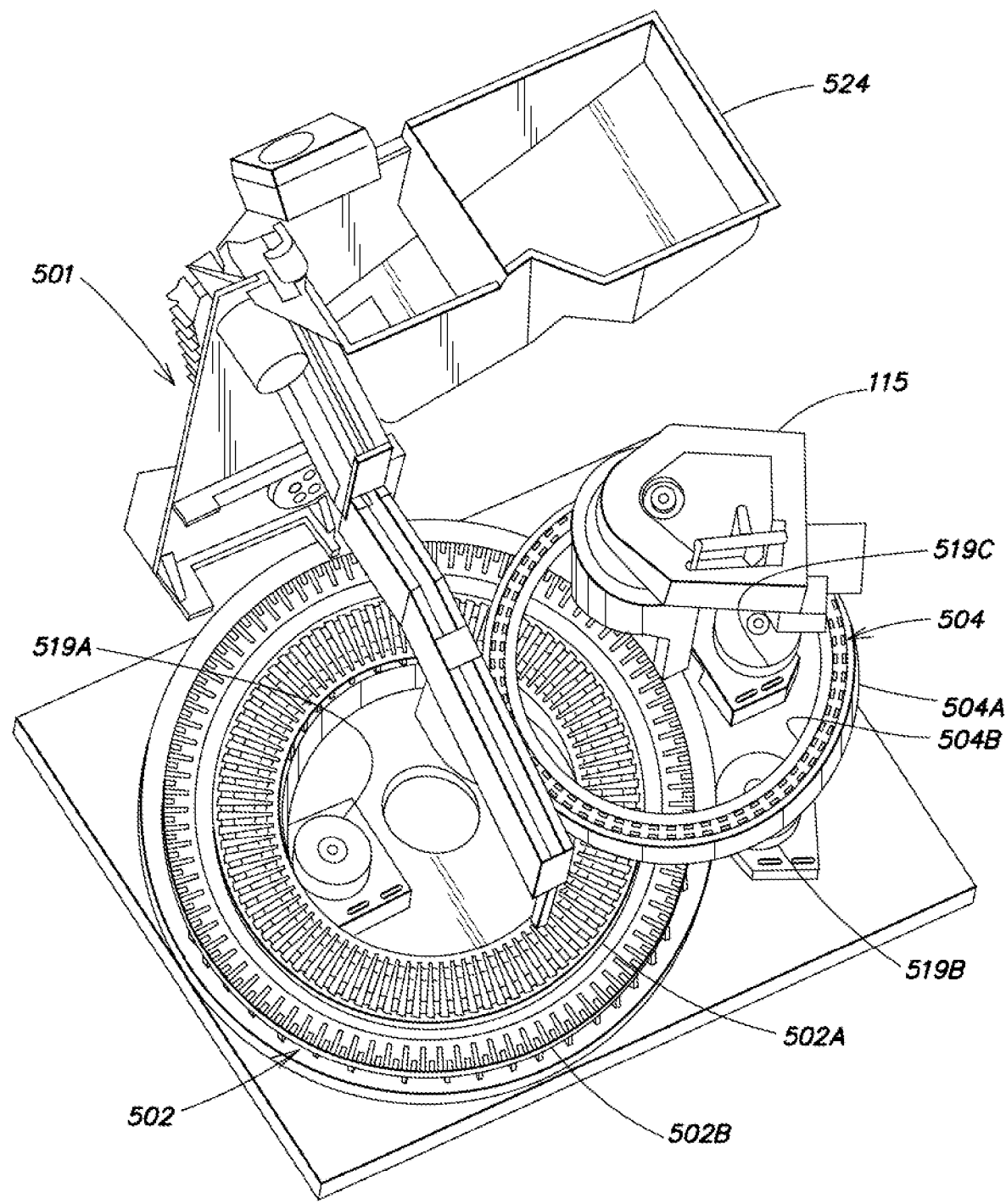
FIG. 5 illustrates an isometric top view of a reaction vessel handling apparatus according to embodiments.

FIG. 5 illustrates another embodiment of a reaction vessel handling apparatus 501. This embodiment includes an incubation member 502 including multiple rings (e.g., concentric rings) that are adapted to contain a plurality of reaction vessels. In the depicted embodiment, an inner incubation ring 502A and an outer incubation ring 502B may be moveable independent of one another. Each of the inner and outer incubation rings 502A, 502B may be driven by a driving member 519A, 519B, which may be driven by suitable motors, such as stepper motors. Driving members 519A, 519B may be gears engaged with gear teeth formed on the inner and outer incubation rings 502A, 502B. Each of the inner and outer incubation rings 502A, 502B may be supported for rotation on tracks or rails or other suitable bearing surfaces. A cover may be provided over some or all of the incubation rings 502A, 502B. It should be apparent that inner and outer rings 502A, 502B may be moveable (e.g., rotatable) in each rotational direction, as desired. The inner and outer rings 502A, 502B may include any number of concentric vessel-holding receptacles therein. As depicted, the inner incubation ring 502B may include two circular and concentric rows of receptacles. The outer incubation ring 502A includes a single circular row of receptacles.

As before, after sample and reagent addition when resident on one of the incubation rings 502A, 502B, a reaction vessel 107, upon reaching a desired incubation time, may be moved from the incubation member 502 to the wash member 504 positioned to overlap the incubation member 502. Wash member 504 may be located at a different elevation (e.g., above the incubation member 502). Movement may be caused by any suitable transfer device, such as one of the transfer devices 122, 322 described with reference to FIGS. 2A and 3A, for example. Other suitable transfer devices may be used to move the reaction vessels from the incubation member 502 to the wash member 504.

Wash member 504 may include a wash ring support 504A and a wash ring 504B supported for rotation on the wash ring support 504A. The wash ring 504B carries the reaction vessels 107 to the one or more wash stations (not shown). Wash ring 504B may be driven by a wash ring driving member 519C (e.g., a gear) engaging like gear teeth on the wash ring 504B. Other suitable drive mechanisms may be used. Suitable bearing surfaces or other rotation accommodating devices may be used to allow the wash ring 504B to rotate on the wash ring support 504A. One or more wash stations, like wash station 106A (shown in FIG. 1), may be provided at suitable locations along the washing member 504. Two, spaced-apart wash stations may be provided in some embodiments.

A testing apparatus 115, such as a luminometer or other testing device described herein may be mounted adjacent to the wash member 504 and receive reaction vessels 107 having been washed from the wash member 504. Reaction vessels may be discarded from the testing apparatus 115 in one embodiment. Testing apparatus 115 may be of conventional construction, other that its location on the wash member 504.

In another embodiment, reaction vessels 107, after receiving washing on the wash member 504, may pass by and not enter the testing apparatus 115, and then return to the incubation member 502 via a return transfer device. Return transfer device may be a second transfer device as described with reference to FIG. 3C herein. Once returned to the incubation member 502, the reaction vessels 107 may receive additional reagent and/or addition of other liquids or material, be further incubated, and then return to the wash member 504 via the first transfer device. Once returned to the wash member 504, the reaction vessels 107 may undergo a second wash operation and then undergo testing at the testing apparatus 115. Thus, it should be apparent that reaction vessels 107 may be loaded onto the wash member 504 by a first transfer device, be washed, be unloaded from the wash member 504 to the incubation member 502 by a return transfer device which is either the first transfer device or a separate second transfer device located at the other area of overlap.

Figure 3C:
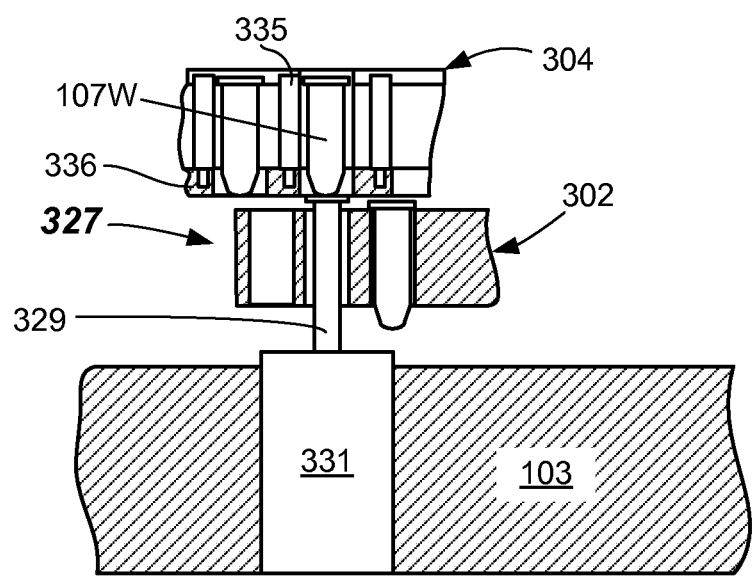
FIG. 3C illustrates partial cross-sectional side view of a transfer device operable to return reaction vessels from a wash member to an incubation member according to embodiments.

In one embodiment, as shown in FIG. 3C, a second transfer device 327 is shown. The second transfer device 327 takes reaction vessels 107 from the elevated level of the wash member 304, and lowers them into the incubation member 304 at the second overlap area between the wash member 304 and the incubation member 302 (e.g., at overlap area 127—FIG. 1). As the moveable ring 336 of the wash member 304 moves past the wash station, a washed reaction vessel 107W bypasses the testing apparatus 115 and progresses to the second overlap area. At this location, an elevator member 329 driven by actuator 331 raises up and contacts the bottom of the washed reaction vessel 107W and then lowers it into a receptacle in the incubation member 302. Having the ability to easily undergo multiple wash cycles and provide return to the incubation member 302 allows extreme versatility in terms of types of tests that can be run and lengths of incubation.

A suitable loader 524 may be used to load reaction vessels 107 into the one or more inner or outer incubation rings 502A, 502B. The reaction vessel handling apparatus 501 may be included in a suitable testing instrument such as an immunoassay instrument. A separate reagent addition system may be used with the reaction vessel handling apparatus 501. Likewise, an aspiration and dispensing system may be used with the reaction vessel handling apparatus 501.

Figure 6:
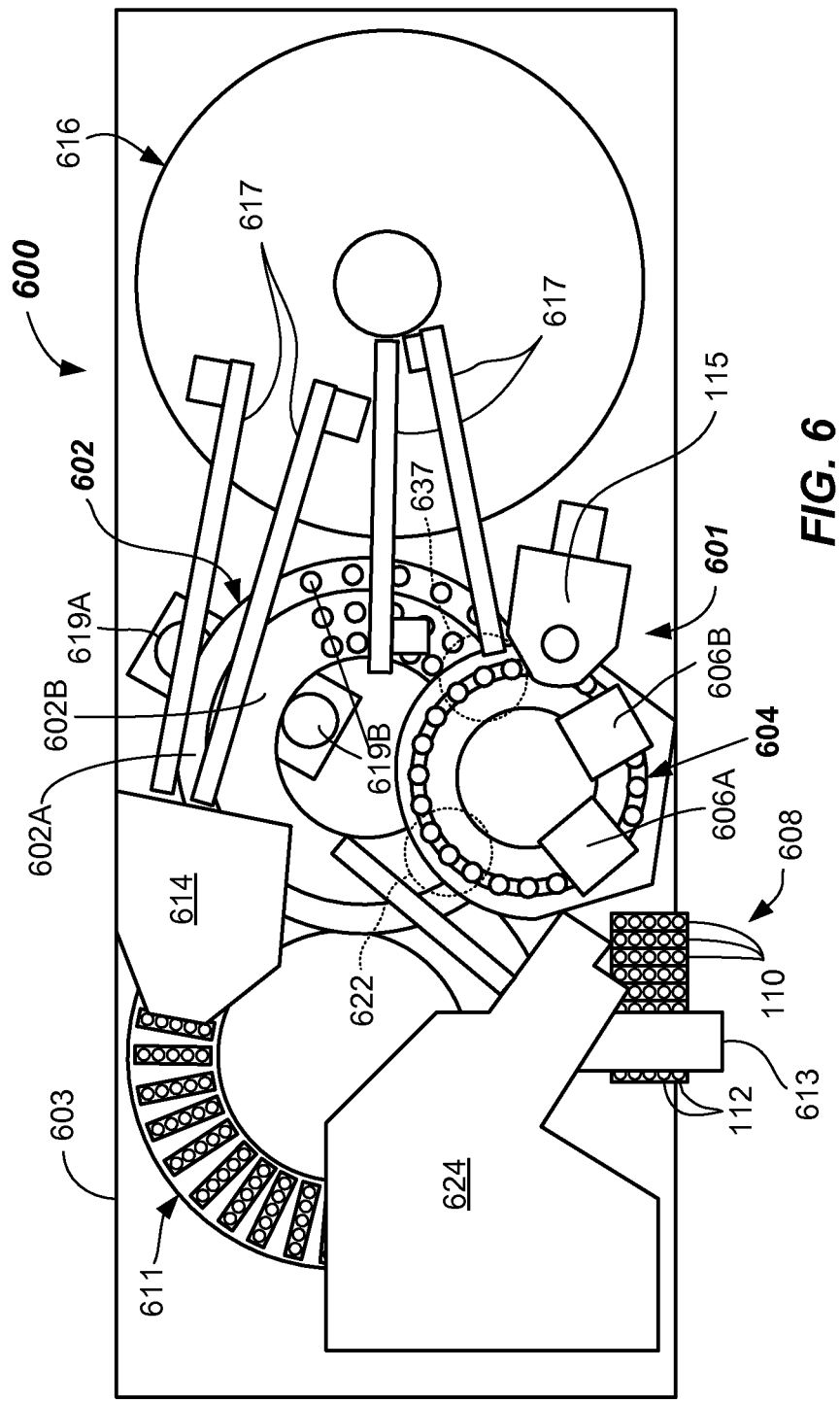
FIG. 6 illustrates a schematic top view of a reaction vessel handling apparatus provided within a testing instrument according to embodiments.

FIG. 6 illustrates another embodiment of an immunoassay apparatus 600 including a reaction vessel transfer apparatus 601. Immunoassay apparatus 600 includes a housing 603 that may fully or partially surround the various internal components and to which the components may be attached. The reaction vessel transfer apparatus 601 may be located within the housing 603 and may be made up of an incubation member 602, including one or more concentric incubation rings, and a wash member 604 such as a wash ring. Each of the incubation member 602 and the wash member 604 may be configured to contain one or more reaction vessels 107 as previously described. Incubation member 602 and a wash member 604 may be partially overlapping rings and may be rotatable about a central axis of each. The incubation member 602 and the wash member 604 may be independently rotatable in some embodiments.

Incubation member 602 may have a circular shape and may have a plurality of receptacles formed therein that are adapted to receive and position reaction vessels 107 thereon. In the depicted embodiment, individual rings (e.g., concentric annular rings) of the incubation member 602 may be independently rotatable relative to one another via drive members 619A, 619B. Thus, the individual incubation rings 602A, 602B may be rotated at different rates and in different directions, for example. Although incubation rings 602A, 602B are described herein, other configurations, such as race tracks, and linearly moveable platforms (e.g., translatable platforms) may be used for the incubation member 602.

The immunoassay apparatus 600 may include a sample input area 608 that may include one or more sample racks 110 containing sample containers 112 (a few labeled). The sample racks 110 may be loaded onto a sample carousel 611 via a rack loader 613. Sample racks 110 may be moved into and/or removed from the immunoassay apparatus 600 through a door or opening formed in the housing 603.

Sample racks 110 and sample containers 112 contained therein are presented to the sample probe apparatus 614 by the rotation of the sample carousel 611 such that samples may be aspirated and transferred to the incubation member 602.

The immunoassay apparatus 600 may include a reagent supply 616 adapted to provide one or more reagent types into the reaction vessels 107 residing in receptacles formed in the incubation member 602. In the depicted embodiments, the reagent supply 616 may be configured as reagent dispenser containers that are mounted on a carousel, wherein the carousel is mounted on a side of the incubation member 602. In particular, the reagent supply 616 may include reagent dispensing containers arranged with their long dimension oriented radially along the rotating carousel and may extend along the radius of the carousel from a rotational axis thereof. Suitable pockets or other retaining features may be provided on the carousel to position and secure the reagent dispenser containers in a defined orientation thereon. Various probes 617 may be used to dispense reagents from the reagent supply 616 into the reaction vessels located in the incubation member 602. One or more than one type of reagent may be carried in the carousel.

As previously described, a wash member 604 may be of the construction shown in FIGS. 3A-3C, for example. Wash member 604 is shown overlapping the incubation member 602 at first and second overlapping locations and transfer devices 622, 637 are provided at those overlap locations. Reaction vessels 107 may be transferred to the wash member 604 from the incubation member 602 via transfer devices 622, 637 (e.g., shown dotted—which may be like transfer devices 122, 322, 327) and may be washed at one or more wash stations 606A, 606B. The washed reaction vessels may undergo testing in testing apparatus 115, or may bypass testing and be transferred back to the incubation member 602 at the overlapping location via second transfer device 637 for additional reagent addition. As in the previous embodiment, a conventional reaction vessel loader 624 may be provided.

Figure 7:
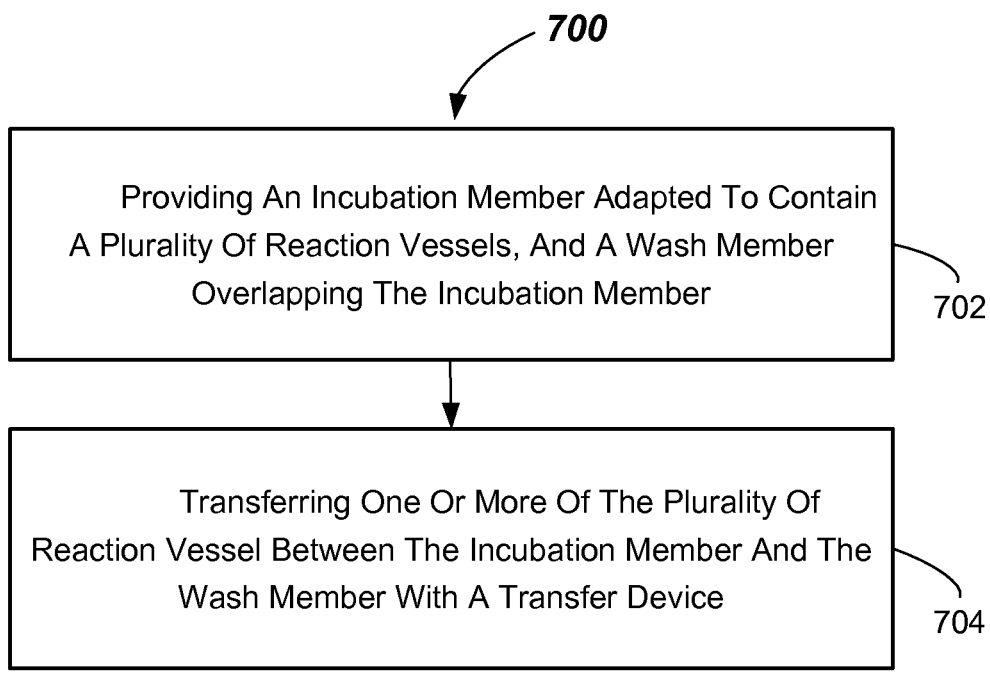
FIG. 7 illustrates a flowchart of a method of operating a reaction vessel handling apparatus according to embodiments.

An embodiment of a method of handling reaction vessels will now be described with reference to FIG. 7. The method 700 includes, in 702, providing an incubation member (e.g., incubation member 102 (in FIG. 1), 302 (in FIG. 3C), 502 (in FIG. 5)) adapted to contain a plurality of reaction vessels (e.g., reaction vessels 107), and a wash member (e.g., wash member 104 (in FIG. 1), 304 (in FIGS. 3A-3C), 504 (in FIG. 5)) overlapping the incubation member; and, in 704, transferring one or more of the plurality of reaction vessel between the incubation member and the wash member with a transfer device (e.g., transfer device 122, 322). The transfer device may move selected reaction vessels between the incubation member and the wash member along a generally vertical path.

An advantage of embodiments of the invention over current immunoassay systems is the physical and functional separation of the reagent addition and incubation process from the washing and testing processes. The reagent addition and incubation processes are often random in nature, where different reaction vessels may undergo any varied number of reagent addition steps and may undergo varied incubation times, depending on the assay methodology used, whereby the washing process is commonly done in succession, where multiple cuvettes are moved in unison through aspiration and dispense cycles followed by the testing (e.g., signal reading step) taking place at a testing apparatus. Embodiments of the present invention increase system flexibility without sacrificing throughput by allowing any incubation time and addition of one or more reagents as desired. Another advantage is that in some embodiments, the wash member 104 may be operated at a faster cycle time than the incubation member 102, such that samples that undergo a second washing process (two-pass assays) do not interfere with samples undergoing their first wash, thus improving throughput system further.

While the invention is susceptible to various modifications and alternative forms, specific immunoassay apparatus, reaction vessel transfer apparatus embodiments and methods thereof have been shown by way of example in the drawings and are described in detail herein. It should be understood, however, that it is not intended to limit the invention to the particular apparatus or methods disclosed but, to the contrary, the intention is to cover all modifications, equivalents, and alternatives falling within the scope of the invention. For example, movement of the reaction vessels may be via a pulling action rather than, or in addition to, a pushing action, caused by any suitable transfer device, such as a vacuum or a gripper.

What is claimed is:

1. A reaction vessel handling apparatus, comprising:
   an incubation member adapted to contain a plurality of reaction vessels;
   a wash member overlapping the incubation member and located at a different elevation; and
   a transfer device, including a first push member operable to move one or more reaction vessels from the incubation member to the wash member and a second push member operable to return the one or more reaction vessels from the wash member to the incubation member.

2. The reaction vessel handling apparatus of claim 1, wherein the incubation member comprises an incubation ring and the wash member comprises a wash ring.

3. The reaction vessel handling apparatus of claim 2, further comprising a testing apparatus adapted to receive the one or more reaction vessels, the testing apparatus coupled to receive the one or more reaction vessels from the wash ring.

4. The reaction vessel handling apparatus of claim 3, wherein the testing apparatus includes a test ring adapted to receive the one or more reaction vessels from the wash ring.

5. The reaction vessel handling apparatus of claim 4, wherein the testing apparatus includes a luminometer adapted to test reaction vessels in the test ring.

6. The reaction vessel handling apparatus of claim 2, wherein the wash ring is positioned vertically above the incubation ring at the different elevation.

7. The reaction vessel handling apparatus of claim 2, wherein the transfer device is operable to both move the one or more reaction vessels from the incubation ring to the wash ring and return reaction vessels from the wash ring to the incubation ring.

8. The reaction vessel handling apparatus of claim 2, wherein the incubation ring further comprises a circular ring of receptacles configured to receive the one or more reaction vessels.

9. The reaction vessel handling apparatus of claim 2, wherein the incubation ring further comprises two or more concentric circular rings of receptacles configured to receive the one or more reaction vessels.

10. The reaction vessel handling apparatus of claim 9, wherein the receptacles of the two or more concentric circular rings are radially aligned along a radial axis of the incubation ring.

11. The reaction vessel handling apparatus of claim 9, wherein the overlapping is configured to allow two or more reaction vessels to be simultaneously transferred between the incubation ring and the wash ring.

12. The reaction vessel handling apparatus of claim 2, wherein the wash ring further comprises two or more concentric circular rings of receptacles configured to receive the one or more reaction vessels.

13. The reaction vessel handling apparatus of claim 2, wherein the incubation ring further comprises two or more concentric circular rings, which are independently rotatable.

14. The reaction vessel handling apparatus of claim 2, comprising a reagent carousel adapted to supply one or more reagents to the incubation ring.

15. The reaction vessel handling apparatus of claim 2, wherein the incubation ring comprises at least two rings that are spaced a sufficient distance apart so that the at least two rings align vertically with receptacles of the wash ring that are spaced apart by at least one receptacle space.

16. The reaction vessel handling apparatus of claim 2, further comprising a testing apparatus positioned adjacent to the wash ring.

17. The reaction vessel handling apparatus of claim 1, wherein:
   the first push member is adapted to move a reaction vessel upwardly, and
   the second push member is adapted to move a reaction vessel downwardly.

18. A testing apparatus, comprising:
   a reaction vessel handling apparatus having
   an incubation member adapted to contain a plurality of reaction vessels,
   a wash member overlapping the incubation member and located at a different elevation, and
   a transfer device, including a first push member operable to move one or more reaction vessels from the incubation member to the wash member and a second push member operable to return the one or more reaction vessels from the wash member to the incubation member;
   a dispensing system adapted to provide biofluid samples and one or more reagents into the plurality of reaction vessels; and
   a testing apparatus adapted to receive reaction vessels from the wash member.

19. A method of handling reaction vessels, comprising:
   providing an incubation member adapted to contain a plurality of reaction vessels, and a wash member overlapping the incubation member at a different elevation;
   transferring one or more of the plurality of reaction vessels from the incubation member to the wash member with a transfer device, including two push members; and
   returning the one or more reaction vessels from the wash member to the incubation member with the transfer device.

20. The method of handling reaction vessels of claim 19, wherein the incubation member comprises an incubation ring and the wash member comprises a wash ring and the transferring comprises a vertical motion between the incubation ring and the wash ring at an overlapping portion.

21. The method of handling reaction vessels of claim 20, wherein the transferring comprises pushing the one or more of the plurality of reaction vessels from a receptacle of the incubation ring directly into a receptacle of the wash ring.

22. The method of handling reaction vessels of claim 21, wherein the transferring comprises a simultaneous pushing the one or more of the plurality of reaction vessels from a receptacle of the incubation ring directly into a receptacle of the wash ring, while pushing the one or more of the plurality of reaction vessels from a receptacle of the wash ring directly into a receptacle of the incubation ring.

\* \* \* \* \*